July 17, 1956 F. S. KING 2,754,876
SAFETY TIRE
Filed May 5, 1953 2 Sheets-Sheet 1
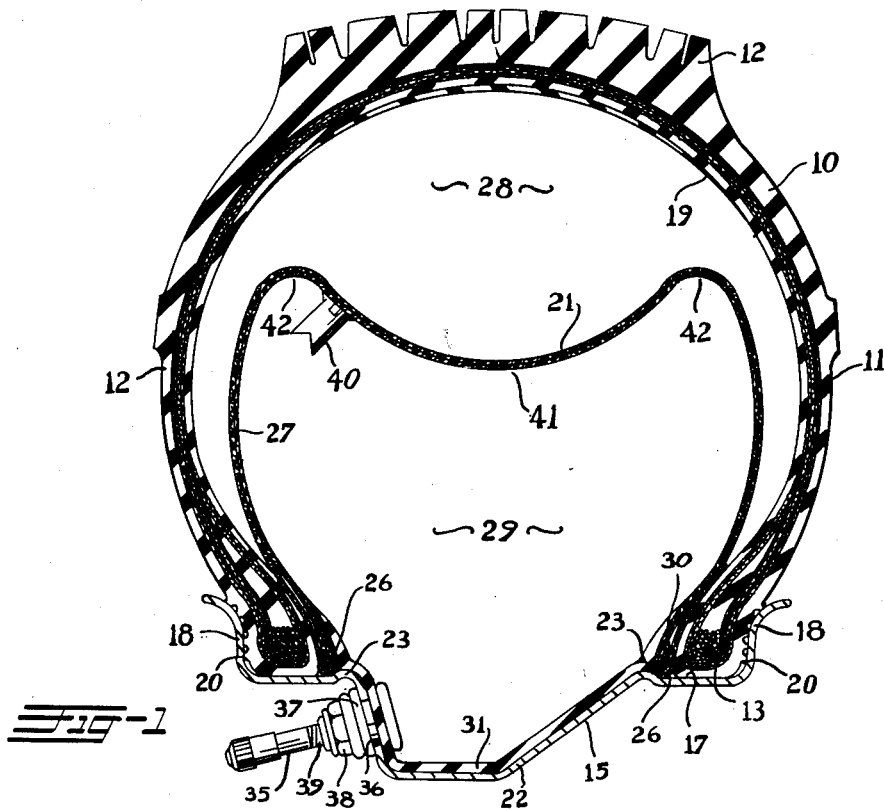
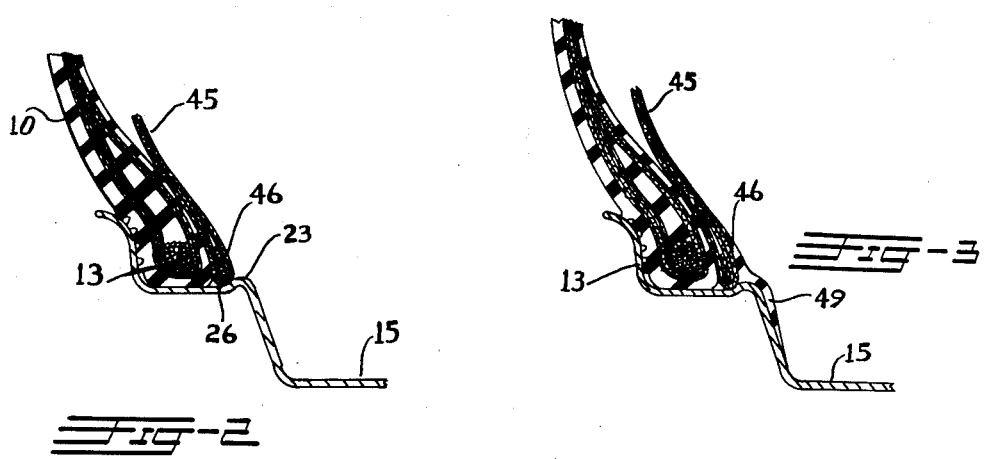
INVENTOR.
FRANK S-KING
BY
W. Q. Fraser July 17, 1956  F. S. KING  2,754,876
SAFETY TIRE
Filed May 5, 1953  2 Sheets-Sheet 2
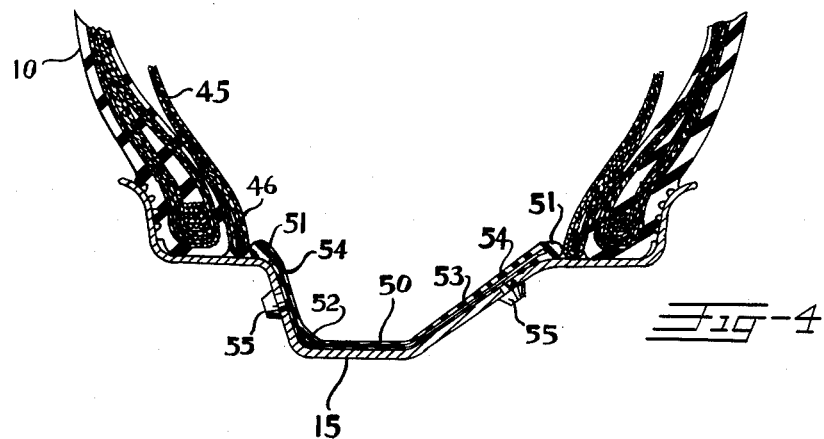
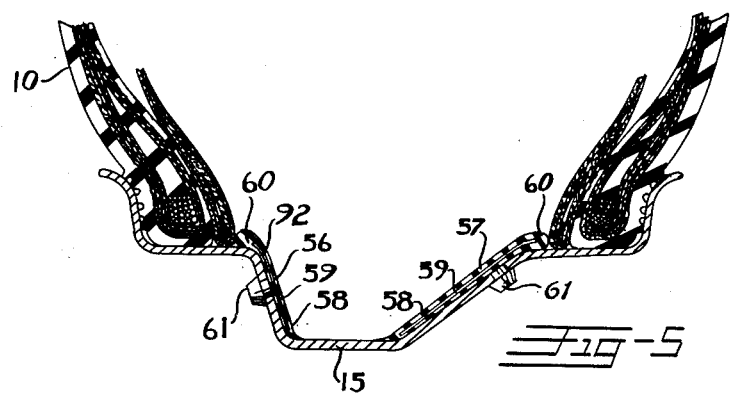
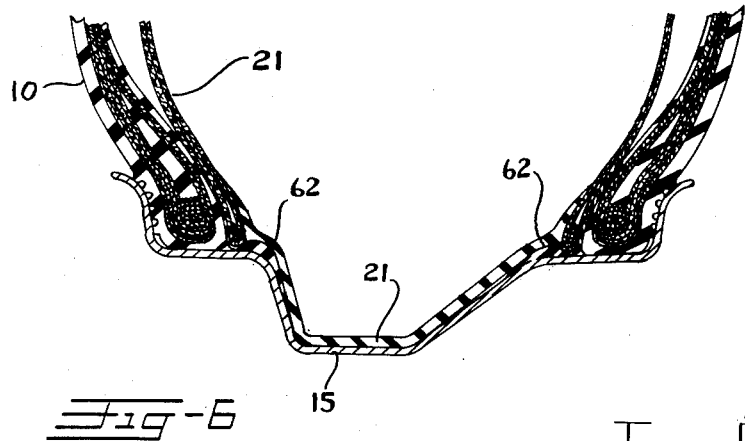
INVENTOR.
BY FRANK S. KING
W. G. Fraser United States Patent Office 2,754,876
Patented July 17, 1956

2,754,876

SAFETY TIRE

Frank S. King, Akron, Ohio, assignor to The Firestone Tire & Rubber Company, Akron, Ohio, a corporation of Ohio Application May 5, 1953, Serial No. 353,066

12 Claims. (Cl. 152—341)

This invention relates to tubeless tires and to improved safety members and rims therefor.

The co-pending application of King and Coben, Serial No. 194,129, now Patent No. 2,713,371, points out the desirability of a safety member to provide blowout protection for tubeless tires and describes one type of member comprising a diaphragm having inextensible beaded edges mounted on ledges molded into the tire for that purpose. This described construction has met with considerable commercial success, but it has the objection that it requires a specially molded tire.

To meet this objection, it has been proposed to seat the beaded edges of the diaphragm on the rim immediately adjacent the beads of the tire. This proposal has its own objection, however, for the rim surfaces which seat the tire beads are tapered, and the centrifugal forces of operation tend to draw the beaded edges of the diaphragm axially off the seats. The present invention overcomes this new problem in two ways, by proper design of the body of the diaphragm and by means of a new and improved rim.

The problem of overcoming the centrifugal force exerted on a safety diaphragm by operation of the tire can be best understood by visualizing the change in shape of the diaphragm under the influence of such force. As the tire rotates, the center of a conventional safety diaphragm is drawn radially outwardly until the cross-section of the diaphragm assumes a roughly triangular form with the sides of the triangle extending outwardly from the beads to an apex at the center of the diaphragm. As a result, there is a component of force exerted on each bead in an axially inward direction which tends to pull the beads into the well of the drop-center rim.

The present invention minimizes this effect of centrifugal force by providing a diaphragm with a recessed crown defined by shoulders of greater diameter than the center of the crown. The shoulders, because of their greater diameter, have a greater peripheral speed than the crown, and, as a result, the centrifugal force exerted on the diaphragm tends to be balanced and neutralized so far as axial components are concerned. Hence, the beads of such a diaphragm tend to stay on the rim. In addition, the invention contemplates a rim having means extending circumferentially around and projecting outwardly beyond each of the rim seats to act as retaining ledges for beaded edges or portions of the diaphragm. In one form of the invention such means comprises integrally formed ribs adjacent the rim seats, while in another form the ribs are formed of rubber vulcanized to the rim, and in yet another form the ribs may be supplied by auxiliary members removably secured to the rim. In any case, whatever form the ribs take, they are intended to cooperate with inextensible bead portions in a safety member whereby the member is held securely in the desired position.

It is accordingly a general object of the present invention to provide a safety member for tubeless tires which can be positioned within the tire and held firmly against the rim so that relative movement between the safety member and rim will be prevented.

Another object of the present invention is to provide a safety member having inextensible beads adapted to seat against suitable rim surfaces and to be held firmly in position whereby such member cannot shift its position during operation of the tire.

Another object is to provide a safety member for tubeless tires which is capable of resisting the centrifugal forces of operation which would otherwise tend to dislodge it from its effective position.

Another object is to provide a safety member which will retain its position so as to provide effective protection against blowouts and which will not throw out of balance during use.

Another object is to provide means associated with conventional tubeless tires and conventional rims whereby safety members can be held firmly in position within such tires.

These and other objects and advantages of the invention will be more fully apparent from the following description of several embodiments of the invention, reference being had to the accompanying drawings in which:

Figure 1 is a radial section of a tubeless tire and safety member mounted on a rim embodying the present invention;

Figure 2 is a fragmentary view showing in radial section a bead portion of a tubeless tire and safety member mounted on a rim having circumferential ribs adapted to hold the safety member in position;

Figure 3 is a view corresponding to Figure 2 showing another form of the invention;

Figure 4 is a fragmentary view showing in radial section the bead portions of a tubeless tire and safety member mounted on a rim having auxiliary means adapted to retain the safety member in the desired position;

Figure 5 is a view similar to Figure 4 showing a modification of the construction of Figure 4; and Figure 6 is a view similar to Figures 4 and 5 showing yet another form of the invention.

Referring now to Figure 1, the invention is illustrated in association with a tubeless tire 10 of more or less conventional construction, the tire having sidewalls 11, a tread portion 12 and bead portions 13. The tire is shown mounted on a rim, indicated generally at 15, according to the invention, with the bead portions 13 of the tire seated on the surfaces or seats 17 adjacent the flanges 18 of the rim. The tire and rim form an air-tight enclosure with the air retained within the tire by a butyl lining 19 which prevents the air from seeping into the carcass of the tire. Ribs 20, which are adapted to be pressed against the flanges 18 of the rim by the pressure within the tire, prevent air from leaking out of the tire at this point.

The rim 15 has a construction which, in combination with the tire, enables a safety member, indicated generally at 21, to be held firmly in position. Before describing the safety member 21 in detail, it should be noted that the rim 15 differs from conventional rims in a number of respects. The seats 17 have an axial dimension substantially greater than the width of the beads 13 of the tire, and the junctures of the seats 17, with the wall 22 of the drop center well of the rim, have circumferentially-extending, radially-projecting ribs 23, as shown, so that when the tire is mounted grooves 26 are defined by the tire beads 13 and the projections 23. These grooves 26 have a function and purpose which will be described in more detail in connection with the description of the safety member 21.

The safety member 21 preferably comprises a two-ply rubberized fabric portion 27 which extends from one bead of the tire to the other bead in a manner to divide the interior of the tire into an outer compartment 28 and an inner compartment 29. The fabric plies are wrapped around and securely anchored to inextensible bead portions 30 which are intended to seat snugly within the grooves 26. In this particular form of the invention, a rubber portion 31 connects the diaphragm beads 30 so that the safety member 21 takes the form of a complete tube. The rubber portion 31 is preferably vulcanized to the beads 30 and is molded so that it will lie snugly against the drop-center well of the rim.

An inflation valve 35 is secured to the rubber portion 31 and extends through a hole 36 in the rim in the manner shown. In order to prevent leakage of air through the rim at the valve, a rubber washer 37 and a compression nut 38 is provided, the nut engaging external threads 39 on the valve stem so that it may be screwed down to compress the washer into sealing engagement with the rim as shown. When air is introduced into the safety member or tube 21 through the valve 35, it passes through a flutter valve 40 into the outer compartment 28. In the event of a blowout with the explosive loss of air from the outer compartment, the ends of the flutter valve will pinch together to seal off the flow of air between the two compartments and thus air will be retained within the inner compartment 29 to give support to the car.

The ribs 23 do not offer any appreciable difficulty in mounting the tire. The seat portions 17 have a slight outward taper of about 5°, and, as a result, the ribs 23 have diameters not substantially greater than the diameters of the seats adjacent the flanges 18. The beads 13 of the tire are sufficiently flexible and have a sufficient cushion of rubber to enable them to be forced over the ribs 23. It will be appreciated that if a quick blast of air is introduced into the tire during inflation, the flutter valve 40 will momentarily seal and the air pressure within the tube will force the beads 30 over the ribs 23 into their proper seating positions in the grooves 26. Once the bead portions 30 of the tube are properly seated, the ribs 23 will prevent them from moving axially inwardly during operation of the tire. In the event of a blowout, the air pressure which is maintained with the compartment 29 will force the beads 30 firmly against the tire so that there will be no chance of their shifting position.

It will be noted that the crown of the safety member 21 is depressed inwardly, as indicated at 41, so that the shoulders 42 have a greater diameter than the crown. The shoulders 42, during operation of the tire, will have therefore a greater rotational speed than the crown, and, as a result, the distortion of the tube due to centrifugal force is such as not to exert any substantial axial component upon the beads 30. With a tube of conventional shape, without a depressed crown, the centrifugal forces of operation tend to draw the tube radially outwardly into a conical or triangular shape, and as a result, an inward axial component is exerted upon the beads which tends to pull them into the well of the rim.

The tire and safety member of Figure 1 can be easily mounted on the rim. The tube 21 is placed within the tire 10 and the tire and tube are mounted over the flanges of the rim by taking advantage of the drop-center well in the usual manner. The valve 35 is placed through the hole 36 of the rim and the adjacent tire bead 13 and tube head 30 are manually forced into proper seating position against the adjacent flange 18 of the rim. A quick blast of air is introduced into the compartment 29 so that the flutter valve 40 will momentarily pinch tight and the air pressure within the tube will force the other tire bead 13 and tube bead 30 over the rib 23 into position against the other flange 18. Within a few seconds there will be sufficient leakage of air through the valve 40 to balance the pressures within the inner and outer compartments and to permit the valve to open. The tire can then be inflated in the usual manner, the only precaution being taken that air is introduced at a rate which is not so rapid as to close off the valve 40.

Another form of the invention is shown in Figure 2. In this embodiment the rim 15 is identical with the rim of Figure 1 and the tire 10 is likewise identical with the tire in Figure 1, but the safety member, indicated generally at 45, does not take the form of a complete tube but rather takes the form of an open diaphragm having inextensible beads 46 which are adapted to seat within the grooves 26 in the same manner as the beads 30 of the tube 21 of Figure 1. The diaphragm 45 is similar in construction to the outer portion 27 of the tube of Figure 1, being made of two plies of rubberized fabric which are wrapped around metal wires to form the beads 46. The diaphragm 45 has a flutter valve and a recessed crown, not shown, similar to tube 21. The diaphragm 45 occasions slightly more difficulty in mounting and inflating, but air can be introduced into the tire by means of a valve, not shown, which in this form of the invention may be secured directly to the rim 15. When air is introduced into the tire, a sufficient amount of air is retained between the diaphragm and the rim to move the beads 46 into sealing engagement with the rim and to cause them to move radially outwardly forcing the tire beads over the ribs 23 and into position against the rim flanges. The inflation of the tire then proceeds in the normal manner.

In order to expedite inflation, the diaphragm 45 of Figure 2 may be provided with thin, soft, rubber flaps such as the flaps 49 shown in Figure 3 which are vulcanized to the beads 46 of the diaphragm. When the assembly is inflated, the first blast of air into the tire will force the rubber flaps 49 into sealing engagement with the adjacent rim surfaces. As additional air is introduced into the tire, the air pressure within the diaphragm will force the unseated beads 46 to move outwardly into seating position with the corresponding rubber flap portions following after and maintaining an air-sealing engagement with the rim.

If desired, the integral ribs 23 of the rim may be omitted and auxiliary means such as a channel-shaped member may be attached to a conventional rim to provide a construction having substantially the same function and results. One such form of the invention is shown in Figure 4 in which a diaphragm 45, similar in all respects to the diaphragm of Figure 2, is shown mounted directly upon the rim seats 17 adjacent the tire beads. In this form of the invention a channel-shaped clip or ring indicated generally at 50 is adapted to be seated snugly within the drop-center well of the rim. The clip 50 has edges indicated at 51 which terminate adjacent the juncture of the rim seats and the drop-center well in substantially the same position as the ribs 23 of Figure 1. These edges 51 thus define, with the tire beads 13, circumferentially-extending grooves in which the diaphragm beads may seat and be held securely in position against any axial forces which may be exerted upon the beads.

Preferably the clip 50 comprises a rubber body 52 having a thin spring metal insert 53 to give strength and to bias the channel in a manner to cause the sides 54 of the member to lie snugly against the sidewalls of the drop-center well. Although not necessary, rubber rivets 55 may be provided to hold the clip 50 in position with respect to the rim, the rivets 55 being of such construction that air cannot leak around them through the wall of the rim. It will be understood that the metal insert 53 must be circumferentially split in one or more points so that the channel member can be mounted over the flanges of the rim.

In another form of the invention, as shown in Figure 5, two separate ring members indicated at 56 and 57 take the place of the clip 50. The ring members differ from each other only in dimension so that they may be secured to the different walls of the drop-center well of the rim. Each of the ring members comprises a rubber body 58 having an embedded metal insert 59 so as to have the desired strength and stiffness, and the members terminate in enlarged edges 60 which perform the same function as the edges 51 of Figure 4 or the ribs 25 of Figure 1. Rubber rivets 61 serve to hold the ring members in the desired positions. Like the channel clip 50, the ring members 56 and 57 must be circumferentially split to facilitate mounting.

In another modification, see Figure 6, rubber ribs indicated at 62 are molded onto a conventional rim 15 to take the place of the integrally-formed ribs 23 of the rim of Figure 1. In this particular embodiment, the rubber ribs 62 are adhesively secured and vulcanized to the rim in a conventional manner, permitting a conventional rim to be modified at a low cost to perform the same function as the special rim of Figure 1. These rubber ribs 62 may be used either with the tubular safety member 21, as shown in Figure 6, or may be used with open diaphragms such as the diaphragm 45 of Figures 2 and 3. Of course, other types of diaphragms may be used with such rims.

Although no inflation valves have been shown for Figures 4, 5 and 6, it would be apparent that in Figures 4 and 5 an inflation valve may be secured directly either to the clip 50 of Figure 4 or to either one of the ring members 56 and 57 of Figure 5 in the same manner the valve of Figure 1 is secured, or the valves may be secured directly to the rim with apertures being provided in the clip 50 or in ring members 56 or 57 to permit air to enter the tire. In Figure 6 an inflation valve is secured to the tube 21 and extends through the rim in the manner shown in Figure 1.

Further modifications and changes in both the safety members and the rim and auxiliary ring members will occur to those skilled in the art without departing from the spirit and scope of the present invention, the essential features of which are summarized in the claims below.

What is claimed is:

1. The combination of a tubeless tire, a drop-center rim having seats supporting the beads of said tire, and a safety member comprising a flexible diaphragm extending from bead to bead of said tire and dividing the space enclosed by the tire and rim into an inner compartment and an outer compartment, said rim having circumferentially extending means extending radially outwardly from the well of said rim adjacent and beyond the axial inward edges of said seats, said means and the toes of the beads of said tire defining outwardly facing grooves, said diaphragm having inextensible, circumferential, bead portions seating snugly in said grooves and thereby to hold said member against bodily displacement in said tire.

2. The combination of claim 1 in which means comprises a circumferential channel-shaped member having a base adapted to seat in the bottom of the well of said rim and having end flanges adapted to lie against the sides of said well and project radially outwardly beyond said seats.

3. The combination of claim 2 in which said flanges comprise rubber-covered metal plates biased axially outwardly away from each other.

4. The combination of a tubeless tire, a drop-center rim having seats supporting the beads of said tire, and a safety member comprising a flexible diaphragm extending from bead to bead of said tire and dividing the space enclosed by the tire and rim into an inner compartment and an outer compartment, said rim having a plurality of circumferentially spaced channel-shaped clips lying in the well of said rim and secured thereto and having their edges projecting radially slightly beyond the inward edges of said seats, said diaphragm having inextensible circumferential bead portions seating snugly on said seats between the toes of said tire beads and the projecting edges of said clips.

5. The combination of a tubeless tire, a rim having seats supporting the beads of said tire, and a safety tube having on outer flexible diaphragm portion extending from bead to bead of said tire and dividing the space enclosed by the tire and rim into an inner compartment and an outer compartment, said rim having circumferentially extending means at the axial inner edges of said beads defining outwardly facing grooves with the toes of the beads of said tire, said tube having inextensible circumferential bead portions seating snugly on said rim seats adjacent the toes of said tire beads, said diaphragm portion having a recessed crown defined by shoulders having greater diameters than the diameter of the intermediate crown portion whereby said diaphraghm portion exerts axially outward components of centrifugal force on said diaphragm bead portions.

6. The combination of claim 1, wherein said means comprises a pair of flat rings lying against and secured respectively to the sides of the well of said rim.

7. The combination of a tubeless tire, a rim having annular seats supporting the beads of said tire, and a safety member comprising a flexible diaphragm extending from bead to bead of said tire and dividing the space enclosed by said tire and rim into an inner compartment and an outer compartment, said rim having circumferentially extending means at the axial inward edges of said seats, said means and the toes of the beads of said tire defining radially outwardly facing grooves, said diaphragm having a recessed crown portion whereby said crown exerts components of centrifugal force axially outwardly on said bead portions and having inextensible circumferential bead portions seating snugly in said grooves to hold said diaphragm securely in position within said tire.

8. The combination of a tubeless tire, a drop center rim having annular seats supporting the beads of said tire, and a safety member comprising a flexible diaphragm extending from bead to bead of said tire and dividing the space enclosed by said tire and rim into an inner compartment and an outer compartment, said rim having circumferentially extending means at the axial inward edges of said seats, said means and the toes of the beads of said tire defining radially outwardly facing grooves, said diaphragm having inextensible circumferential bead portions seating snugly in said grooves to hold said diaphragm securely in position within said tire, and having flexible flap portions vulcanized to said bead portions and adapted to extend downwardly into the drop center well of said rim.

9. The combination of a tubeless tire, a drop center rim having annular seats supporting the beads of said tire, and a safety member comprising a flexible diaphragm extending from bead to bead of said tire and dividing the space enclosed by said tire and rim into an inner compartment and an outer compartment, said rim having circumferentially extending means at the axial inward edges of said seats, said means and the toes of the beads of said tire defining radially outwardly facing grooves, said diaphragm having inextensible circumferential bead portions seating snugly in said grooves to hold said diaphragm securely in position within said tire, and having flexible flap portions vulcanized to said bead portions and adapted to extend downwardly into the drop center well of said rim, said flap portions diminishing in thickness from said bead portions to the free ends thereof.

10. The combination of a tubeless tire, a rim having annular seats supporting the beads of said tire, and a safety member comprising a flexible diaphragm extending from bead to bead of said tire and dividing the space enclosed by said tire and rim into an inner compartment and an outer compartment, said rim having circumferentially extending metallic ribs projecting radially outwardly and slightly beyond said seats at the axial inward edges of said seats, said ribs and the toes of the beads of said tire defining radially outwardly facing grooves, said diaphragm having inextensible circumferential bead portions seating snugly in said grooves and thereby to hold said diaphragm securely in position within said tire.

11. The combination of a tubeless tire, a rim having seats supporting the beads of said tire, and a safety tube having outer inextensible, flexible diaphragm portion extending outwardly from bead to bead of said tire and dividing the space enclosed by said tire and rim into an inner compartment and an outer compartment, and having an inner portion of rubber adapted to lie adjacent said rim, said rim having circumferentially extending radially projecting means at the axial inward edges of said seats, said means and the toes of the beads of said tire defining outwardly facing grooves, said tube having inextensible circumferential beads positioned at the juncture of said inner and outer portions and seating snugly in said grooves whereby to hold said tube against bodily displacement within said tire.

12. The combination of a tubeless tire, a rim having annular seats supporting the beads of said tire, and a safety member comprising a flexible diaphragm extending from bead to bead of said tire and dividing the space enclosed by the tire and rim into an inner compartment and an outer compartment, said rim having circumferentially extending rubber ribs vulcanized to said rim and projecting slightly beyond said seats in a radial direction at the axial inward edges of said seats, said ribs and the toes of the beads of said tire defining radially outwardly facing grooves, said diaphragm having inextensible circumferential bead portions seating snugly in said grooves and thereby to hold said diaphragm securely in position within said tire.

References Cited in the file of this patent

UNITED STATES PATENTS

| | | |
|---|---|---|
| 1,889,799 | Clark | Dec. 6, 1932 |
| 2,173,065 | Lee | Sept. 12, 1939 |
| 2,198,978 | Sauer | Apr. 30, 1940 |
| 2,554,815 | Church | May 29, 1951 |

FOREIGN PATENTS

| | | |
|---|---|---|
| 6,232 | Great Britain | 1903 |
| 658,465 | Great Britain | Oct. 10, 1951 |

OTHER REFERENCES

"Tires, Service Station," page 36, vol. XXXII, No. 7, Feb. 1951.